(12) United States Patent
Foster et al.

(10) Patent No.: US 8,515,658 B1
(45) Date of Patent: Aug. 20, 2013

(54) MANAGING NAVIGATIONAL CHART PRESENTATION

(75) Inventors: Susan A. Foster, Centennial, CO (US); Paul Richard Kuhn, El Cerrito, CA (US); Roxane Ouellet, Centennial, CO (US); Gitta B. Salomon, San Francisco, CA (US); Jason K. Ward, Oakland, CA (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 12/498,112

(22) Filed: Jul. 6, 2009

(51) Int. Cl.
*G01C 21/00* (2006.01)

(52) U.S. Cl.
USPC .......... 701/208; 340/945; 340/988; 340/990; 340/995.1; 340/995.14; 701/3; 701/123; 701/400; 701/410; 701/461; 701/467; 701/528

(58) Field of Classification Search
USPC . 701/200–226; 340/988–996; 715/700–866; 345/156–173
See application file for complete search history.

(56) References Cited

U.S. PATENT DOCUMENTS

| | | | | |
|---|---|---|---|---|
| 4,796,190 A * | 1/1989 | Cummings | ............... | 701/532 |
| 4,994,974 A * | 2/1991 | Cummings | ............... | 701/532 |
| 5,475,594 A * | 12/1995 | Oder et al. | ............... | 701/14 |
| 5,541,863 A * | 7/1996 | Magor et al. | ............... | 702/122 |
| 5,663,748 A | 9/1997 | Huffman et al. | | |
| 5,916,297 A * | 6/1999 | Griffin et al. | ............... | 701/120 |
| 5,978,715 A * | 11/1999 | Briffe et al. | ............... | 701/11 |
| 6,071,316 A * | 6/2000 | Goossen et al. | ............... | 717/126 |
| 6,112,141 A * | 8/2000 | Briffe et al. | ............... | 701/14 |
| 6,232,932 B1 * | 5/2001 | Thorner | ............... | 345/1.3 |
| 6,311,327 B1 * | 10/2001 | O'Brien et al. | ............... | 717/114 |
| 6,381,519 B1 * | 4/2002 | Snyder | ............... | 701/3 |
| 6,401,013 B1 * | 6/2002 | McElreath | ............... | 701/3 |
| 6,542,796 B1 * | 4/2003 | Gibbs et al. | ............... | 701/3 |
| 6,573,914 B1 * | 6/2003 | Pauly et al. | ............... | 715/769 |
| 6,597,294 B1 * | 7/2003 | Ariens | ............... | 340/995.26 |
| 6,633,801 B1 * | 10/2003 | Durlacher et al. | ............... | 701/9 |
| 6,633,810 B1 * | 10/2003 | Qureshi et al. | ............... | 701/467 |
| 6,661,353 B1 * | 12/2003 | Gopen | ............... | 340/973 |
| 6,693,558 B2 * | 2/2004 | Hedrick | ............... | 340/971 |
| 7,113,167 B2 | 9/2006 | Roux | | |
| 7,149,612 B2 * | 12/2006 | Stefani et al. | ............... | 701/35 |
| 7,370,790 B2 | 5/2008 | Martincik | | |
| 7,421,319 B2 | 9/2008 | Stefani | | |
| 7,437,220 B2 * | 10/2008 | Stefani | ............... | 701/3 |
| 7,693,621 B1 * | 4/2010 | Chamas | ............... | 701/16 |
| 7,756,637 B2 | 7/2010 | Wipplinger et al. | | |
| 7,769,501 B2 | 8/2010 | Lusardi et al. | | |
| 7,840,770 B2 * | 11/2010 | Larson et al. | ............... | 711/165 |
| 7,876,238 B2 | 1/2011 | Vandenbergh et al. | | |
| 7,966,125 B2 | 6/2011 | Wipplinger et al. | | |
| 8,009,032 B2 * | 8/2011 | Long et al. | ............... | 340/500 |
| 8,027,786 B2 | 9/2011 | Wipplinger et al. | | |
| 8,041,504 B2 | 10/2011 | Shafaat et al. | | |

(Continued)

*Primary Examiner* — Jonathan M. Dager

(74) *Attorney, Agent, or Firm* — Yee & Assoiciates, P.C.

(57) ABSTRACT

In one advantageous embodiment, a method for managing presentation of a navigational chart on a touchscreen display device is presented. A user input is received on a surface of the touchscreen display device on which the navigational chart is presented. A number of portions of the navigational chart corresponding to the surface on which the user input was received are identified, using a processor unit connected to the touchscreen display device. A number of graphical indications are presented on the navigational chart in association with each of the number of portions identified by the processor unit.

20 Claims, 9 Drawing Sheets

(56) References Cited

U.S. PATENT DOCUMENTS

| | | | |
|---|---|---|---|
| 8,095,302 B2* | 1/2012 | Lutz et al. | 701/445 |
| 8,188,889 B2 | 5/2012 | Shafaat et al. | |
| 8,195,347 B2 | 6/2012 | Boorman | |
| 8,364,328 B2* | 1/2013 | Hedrick | 701/3 |
| 2002/0118166 A1* | 8/2002 | Roux | 345/156 |
| 2002/0149598 A1* | 10/2002 | Greier et al. | 345/589 |
| 2003/0003872 A1* | 1/2003 | Brinkley et al. | 455/66 |
| 2003/0223614 A1* | 12/2003 | Robins et al. | 382/100 |
| 2005/0004745 A1* | 1/2005 | Rumbo et al. | 701/200 |
| 2005/0057440 A1* | 3/2005 | Naimer et al. | 345/8 |
| 2005/0276514 A1* | 12/2005 | Fisher | 382/286 |
| 2005/0283305 A1* | 12/2005 | Clark et al. | 701/120 |
| 2005/0288831 A1* | 12/2005 | Lusardi et al. | 701/3 |
| 2006/0041340 A1* | 2/2006 | Stefani | 701/4 |
| 2006/0238511 A1* | 10/2006 | Gyde et al. | 345/168 |
| 2006/0282597 A1* | 12/2006 | Plogmann | 710/303 |
| 2007/0040011 A1* | 2/2007 | Martincik et al. | 235/61 N V |
| 2007/0046670 A1* | 3/2007 | Hedrick et al. | 345/440 |
| 2007/0150124 A1* | 6/2007 | Wipplinger et al. | 701/3 |
| 2007/0150125 A1* | 6/2007 | Aspen | 701/3 |
| 2007/0168120 A1* | 7/2007 | Vandenbergh et al. | 701/208 |
| 2007/0298849 A1 | 12/2007 | Kang et al. | |
| 2008/0114537 A1* | 5/2008 | Aspen | 701/207 |
| 2008/0125960 A1 | 5/2008 | Wipplinger et al. | |
| 2008/0140266 A1* | 6/2008 | Stefani | 701/3 |
| 2008/0154442 A1* | 6/2008 | Wipplinger et al. | 701/3 |
| 2008/0163093 A1* | 7/2008 | Lorido | 715/771 |
| 2008/0215193 A1* | 9/2008 | Hanson | 701/3 |
| 2008/0262664 A1* | 10/2008 | Schnell et al. | 701/4 |
| 2009/0112464 A1* | 4/2009 | Belcher | 701/210 |
| 2009/0153343 A1* | 6/2009 | Shafaat et al. | 340/686.1 |
| 2009/0157287 A1* | 6/2009 | Shafaat et al. | 701/120 |
| 2009/0198392 A1* | 8/2009 | Eicke et al. | 701/3 |
| 2009/0228195 A1* | 9/2009 | Lutz et al. | 701/200 |
| 2009/0228202 A1* | 9/2009 | Wipplinger et al. | 701/206 |
| 2009/0248224 A1* | 10/2009 | Tschannen | 701/3 |
| 2009/0265050 A1* | 10/2009 | Burpee | 701/16 |
| 2009/0265056 A1* | 10/2009 | Yukawa et al. | 701/29 |
| 2010/0039438 A1* | 2/2010 | Kennedy | 345/581 |
| 2010/0100313 A1* | 4/2010 | Aspen | 701/208 |
| 2010/0145605 A1* | 6/2010 | Valex et al. | 701/200 |
| 2010/0220113 A1* | 9/2010 | Kennedy | 345/660 |
| 2010/0262318 A1* | 10/2010 | Ariens | 701/3 |
| 2010/0283636 A1* | 11/2010 | Clark et al. | 340/971 |
| 2010/0295706 A1* | 11/2010 | Mathan et al. | 340/951 |
| 2010/0305786 A1* | 12/2010 | Boorman | 701/16 |
| 2010/0315265 A1* | 12/2010 | Smith et al. | 340/963 |

\* cited by examiner

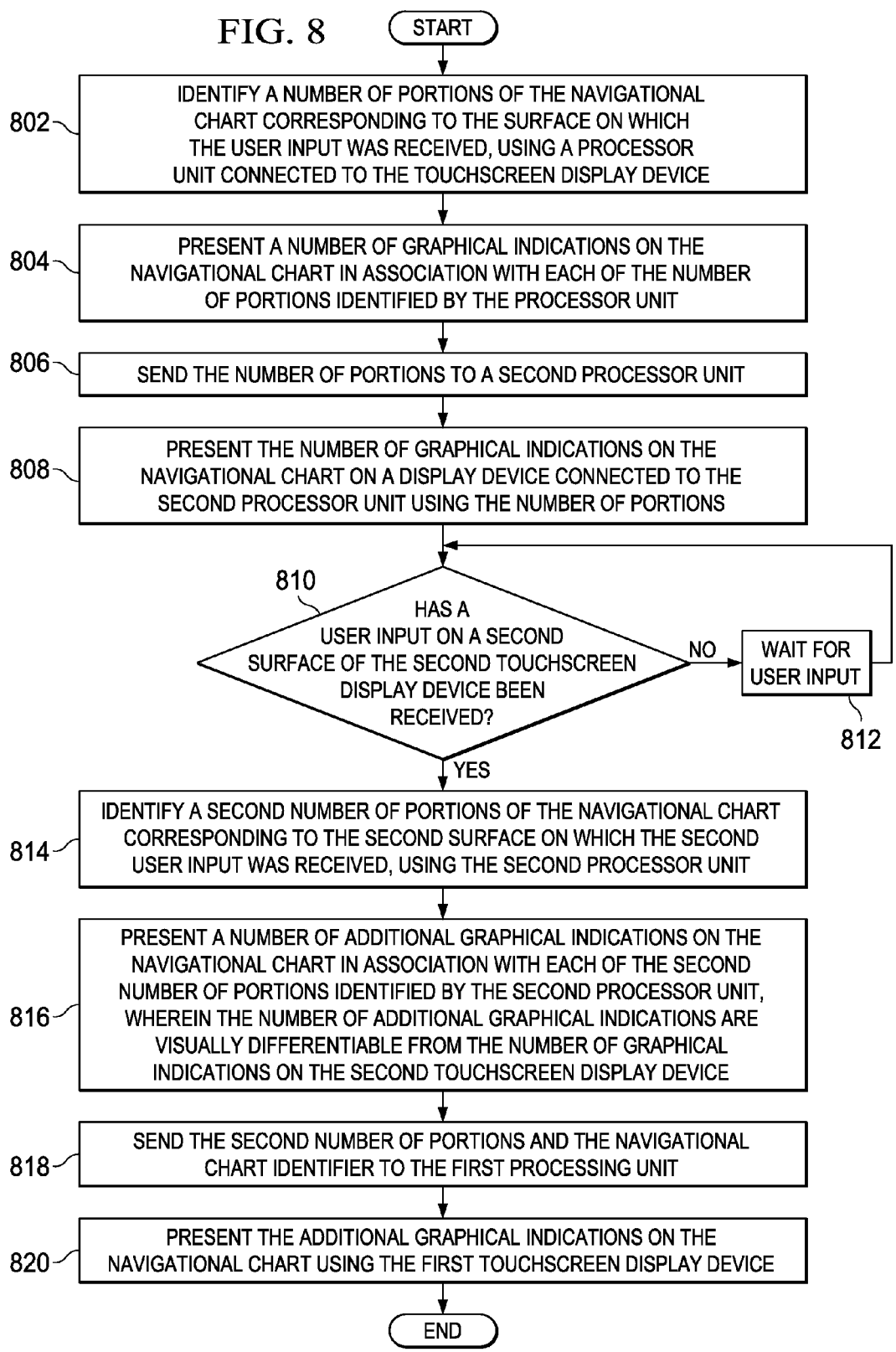

MANAGING NAVIGATIONAL CHART PRESENTATION

BACKGROUND INFORMATION

1. Field

The present disclosure relates generally to navigation and in particular to a method and apparatus of presenting navigation information. Still more specifically the present disclosure relates to a method, apparatus, and computer program product for managing presentation of a navigational chart on a touchscreen display device.

2. Background

Aircraft pilots frequently refer to navigational charts while planning and executing a flight plan. Navigational charts provide the pilots with aeronautical information used for flight planning or while flying an aircraft. This information includes, for example, the locations of runways, the radio frequencies in use at a given airport, weather patterns over a particular region, and potential hazards in a particular region. Previously, pilots would carry a flight bag onto each flight. This flight bag contained paper charts and could weigh in excess of 40 pounds. Currently, this flight bag has been replaced with a data processing system called an electronic flight bag. The electronic flight bag condenses the flight bag containing paper charts into a portable electronic device.

One activity performed by pilots prior to takeoff is a study of the navigational charts that will be used during an upcoming flight. Prior to the creation of the electronic flight bag, pilots would frequently use highlighters on the paper navigational charts in order to call attention to specific areas of interest. Once the area was highlighted on the paper navigational chart, the pilot would see the highlighted area of the chart during flight and recall the intended meaning of the highlight.

Similarly, pilots frequently conduct a meeting prior to takeoff with the co-pilot to discuss the flight plan. Prior to the creation of the electronic flight bag, the pilot and co-pilot used highlighters on the paper navigational charts to call attention to various areas on one or more charts during the discussion. Highlighters allowed the pilot and co-pilot to mark an area that had already been covered during the discussion, or mark an area that required additional attention during the flight.

While the electronic flight bag is a convenient replacement for the paper navigational charts of the past, using the electronic flight bag may make studying and discussing navigational charts more complex for pilots and/or co-pilots. Pilots and co-pilots still use paper navigational charts and highlighters to make notes for a flight in addition to using the electronic flight bag. In some cases, pilots and co-pilots may make notations on a separate sheet of paper or conduct the pre-flight meeting completely orally, leaving the record of what navigational chart areas were discussed to memory.

Thus, it would be advantageous to have a method and apparatus that takes into account one or more of the issues discussed above, as well as possibly other issues.

SUMMARY

In one advantageous embodiment, a method for managing presentation of a navigational chart on a touchscreen display device is presented. A user input is received on a surface of the touchscreen display device on which the navigational chart is presented. A number of portions of the navigational chart corresponding to the surface on which the user input was received are identified, using a processor unit connected to the touchscreen display device. A number of graphical indications are presented on the navigational chart in association with each of the number of portions identified by the processor unit.

In another advantageous embodiment, a computer program product for managing presentation of a navigational chart on a touchscreen display device is presented. The computer program product comprises a computer usable storage medium including computer usable program code for managing presentation of a navigational chart on a touchscreen display device. The computer program product includes instructions adapted to cause a computer to receive a user input on a surface of the touchscreen display device on which the navigational chart is presented, identify a number of portions of the navigational chart corresponding to the surface on which the user input was received, using a processor unit connected to the touchscreen display device, and present a number of graphical indications on the navigational chart in association with each of the number of portions identified by the processor unit.

In yet another advantageous embodiment, an apparatus for managing presentation of a navigational chart on a touchscreen display device is presented. The apparatus comprises a touchscreen display device and a processor unit in communication with the touchscreen display device. The processor unit is configured to receive a user input on a surface of the touchscreen display device on which the navigational chart is presented, identify a number of portions of the navigational chart corresponding to the surface on which the user input was received, using a processor unit connected to the touchscreen display device, and present a number of graphical indications on the navigational chart in association with each of the number of portions identified by the processor unit.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 8 is a flowchart of a process for transmission of navigational information between two electronic flight bags in accordance with an advantageous embodiment;

DETAILED DESCRIPTION

Figure 1:
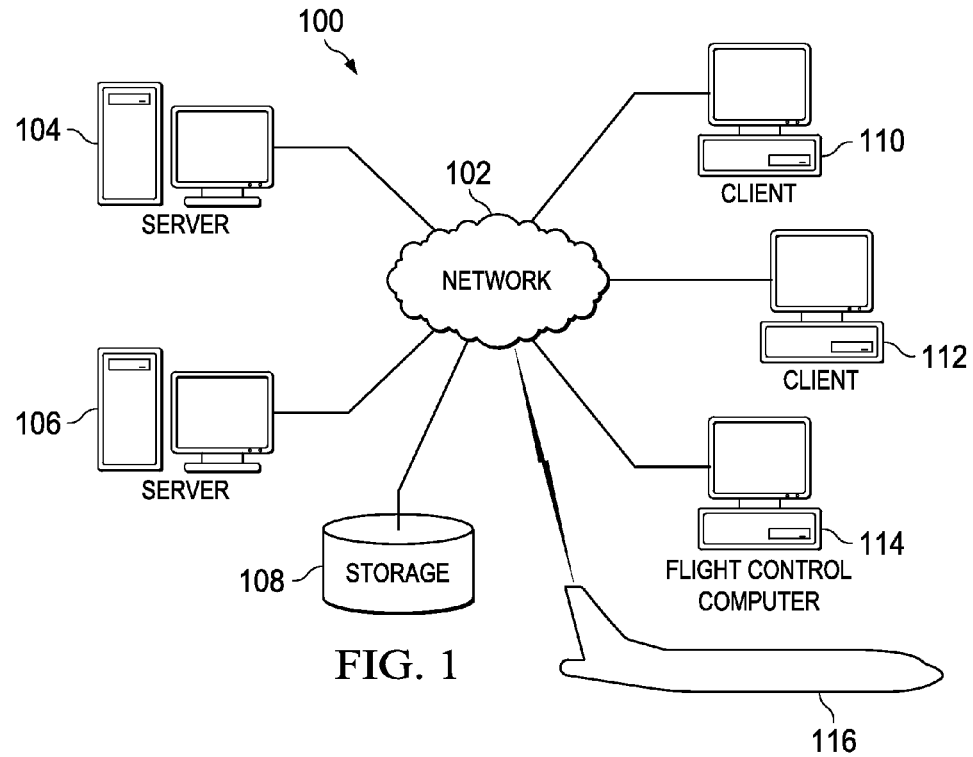
FIG. 1 is a pictorial representation of a network of data processing systems in which the advantageous embodiments may be implemented.
Figure 2:
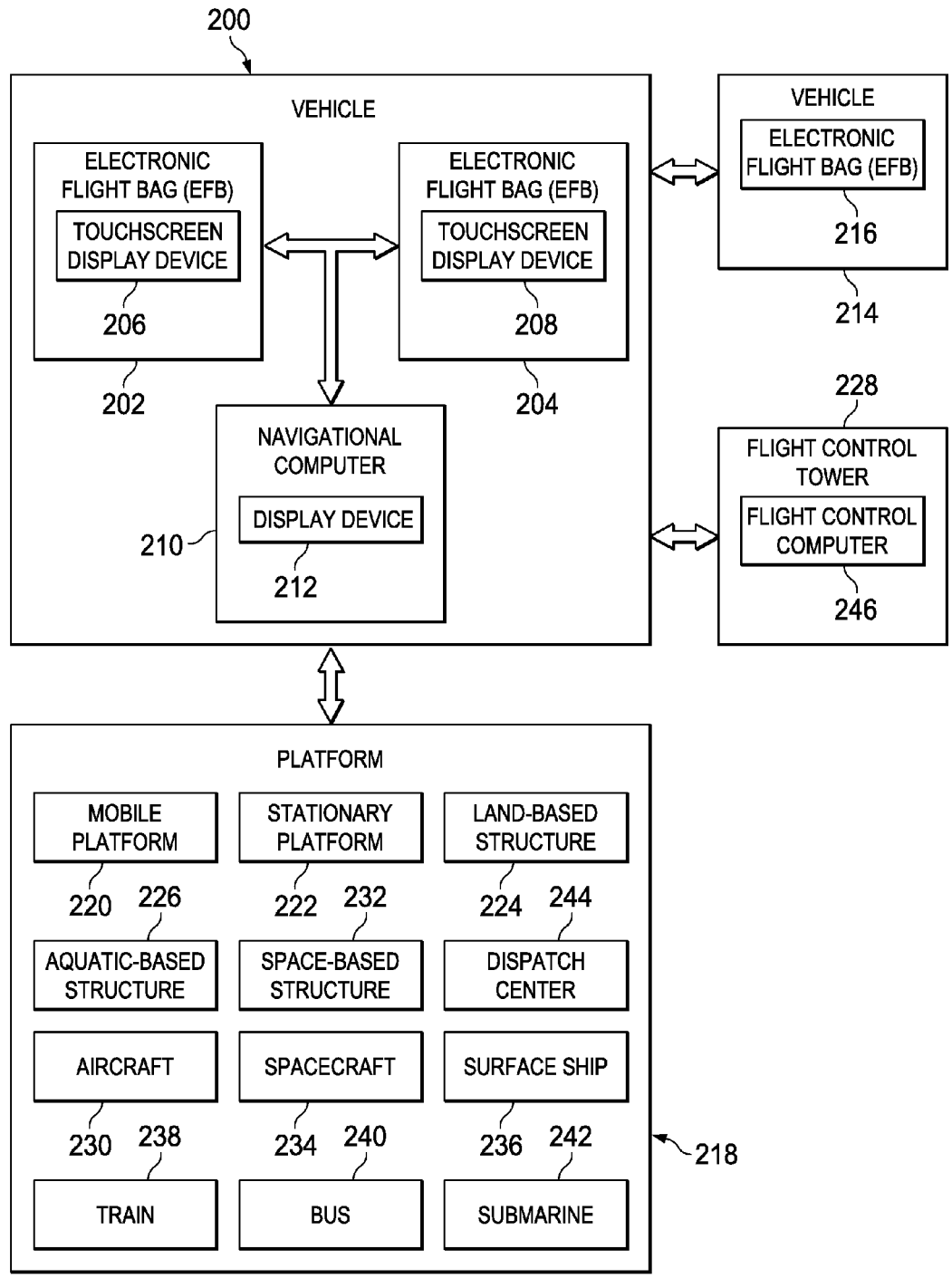
FIG. 2 is a block diagram of vehicles and platforms in which the advantageous embodiments may be implemented.

With reference now to the figures and in particular with reference to FIGS. 1 and 2, exemplary diagrams of data processing environments are provided in which the advantageous embodiments of the present invention may be implemented. It should be appreciated that FIGS. 1 and 2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables. In the depicted example, server 104 and server 106 connect to network 102 along with storage unit 108. In addition, clients 110 and 112, along with flight control computer 114, connect to network 102. These clients 110 and 112, and flight control computer 114 may be, for example, personal computers or network computers. In the depicted example, server 104 provides data, such as boot files, operating system images, and applications to clients 110 and 112 and flight control computer 114. Clients 110 and 112 and flight control computer 114 are clients to server 104 in this example. Aircraft 116 also is a client that may exchange information with clients 110 and 112, and flight control computer 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and flight control computer 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as, for example, an intranet, a local area network (LAN), or a wide area network (WAN). As used herein "a number" when referring to items mean one or more items. For example, a number of different types of networks is one or more different types of networks. FIG. 1 is intended as an example, and not as an architectural limitation, for different embodiments.

Turning now to FIG. 2, a block diagram of vehicles and platforms in which the advantageous embodiments may be implemented is depicted. In advantageous embodiments, electronic flight bag 202, electronic flight bag 204, navigational computer 210, electronic flight bag 216, and flight control computer 246 are data processing systems. Flight control computer 246 may be an implementation of flight control computer 114. Electronic flight bag 202, electronic flight bag 204, and navigational computer 210 are in communication with one other and with vehicle 200.

Vehicle 200 may be implemented as aircraft 116. The connections between vehicle 200, vehicle 214, flight control tower 228, and platform 218 may be a network, such as network 102. Electronic flight bag 202, electronic flight bag 204, electronic flight bag 216, and flight control computer 246 may connect to the network as clients, such as client 110, client 112, and flight computer 114. In other advantageous embodiments, electronic flight bag 202, electronic flight bag 204, electronic flight bag 216, and flight control computer 246 connect to the network as servers, such as server 104 and server 106.

As used herein, "in communication with" means connected to one another in a manner that allows for an exchange of information between the components. The information may be text, images, programs, logs, or any other form of data.

Electronic flight bag 216 is in communication with vehicle 214. Electronic flight bag 202, electronic flight bag 204, and navigational computer 210 are also in communication with electronic flight bag 216 in vehicle 214 and flight control computer 246 in flight control tower 228. In some embodiments, electronic flight bag 202, electronic flight bag 204 and navigational computer 210 are in communication with platform 218. Platform 218 may be any combination of mobile platform 220, stationary platform 220, land-based structure 224, aquatic-based structure 226, space-based structure 232, dispatch center 244, aircraft 230, spacecraft 234, surface ship 236, train 238, bus 240, and submarine 242. The connections between platform 218, electronic flight bag 202, electronic flight bag 204, electronic flight bag 216, navigational computer 210, and flight control computer 246 may be implemented using a network, such as network 102. Electronic flight bag 202, electronic flight bag 204, and navigational computer 210 may also be physically attached to vehicle 200 using a permanent or temporary mounting.

Touchscreen display device 206 is connected to electronic flight bag 202, while touchscreen display device 208 is connected to electronic flight bag 204. In some examples, touchscreen display device 206 may be part of electronic flight bag 202. Display device 212 is connected to navigational computer 210. Display device also may be a touchscreen device or a display without touchscreen input mechanisms. Touchscreen display device 206, touchscreen display device 208, and display device 212 present information such as navigational charts. Touchscreen display device 206 and touchscreen display device 212 may be an implementation of display device 212 that is also capable of accepting user input through touch. The touch may be registered by using one or more fingers or one or more styli.

In advantageous embodiments, electronic flight bag 202 presents a navigational chart on touchscreen display device 206. Electronic flight bag 202 accepts a user input using touchscreen display device 206. The user input may be a request to enable highlighting on the navigational chart. In some embodiments, however, highlighting is enabled automatically once the navigational chart is presented on touchscreen display device 206.

Once highlighting is enabled, electronic flight bag 202 waits for touches to the navigational chart on touchscreen display device 206. The touches may be provided by a user, such as the pilot or co-pilot. A number of touch inputs or touches may be generated by the user pressing and dragging the user's finger over a desired area. The user input also may be entered using a stylus or other device.

Electronic flight bag 202 receives the user input as a number of coordinates and determines the chart coordinates designated by the user input. In some examples, the number of coordinates are the coordinates relating to where the touch was registered on touchscreen display device 206. The chart coordinates may be specific to a chart. For example, every chart has a coordinate system beginning at (0,0) and ending at the maximum length and width of that particular chart. In other examples, the chart coordinates are a coordinate system common between charts, such as latitude/longitude. Electronic flight bag 202 then stores the coordinates and an association between the coordinates and the navigational chart on which they were input.

Electronic flight bag 202 displays a graphical indication on the navigational chart at each of the coordinates. In some embodiments, the graphical indication is a highlight. The highlight may be translucent, thus allowing the portion of the navigational chart underlying the highlight to remain at least partially visible on touchscreen display device 206. In such embodiments, the user drags his finger along a desired path on the navigational chart, and electronic flight bag 202 highlights the path taken by the dragging finger. Electronic flight bag 202 may also move or rotate the navigational chart on touchscreen display device 206, based on movement or rotation of vehicle 200.

In an embodiment, the user, such as the pilot, now activates (touches) a control on touchscreen display device 206. By way of example, the control may be a button marked "Transfer," but the control may instead be an icon, or a switch. In another embodiment, the control is activated after a period of inactivity has elapsed. Once the control is activated, electronic flight bag 202 requests that the user designate an intended recipient of the highlighting. The request may be in the form of a menu with a list of possible recipients. The request may also be presented as a field in which the user enters a name or identification number of the recipient.

Possible recipients may be other data processing systems that advertise on the network the capability to receive transmissions from electronic flight bag 202. In the depicted example, possible recipients may be, but are not limited to, electronic flight bag 204, navigational computer 210, electronic flight bag 216, and flight control computer 246. In one embodiment, the pilot using electronic flight bag 202 wishes to point out an area in a navigational chart to the co-pilot using electronic flight bag 204. Therefore, the intended recipient is electronic flight bag 204. In other embodiments, however, the intended recipient is electronic flight bag 216, flight control computer 246, and/or navigational computer 210. Additionally, electronic flight bag 204 may receive more than one intended recipient as an input.

After the recipient is designated, electronic flight bag 202 information designated by the user is input to electronic flight bag 204. This information may be, for example, the number of coordinates in the navigational chart, an identification of the user, and an identification of the navigational chart. The navigational chart may be sent in place of or in addition to the identification of the navigational chart. In another embodiment, electronic flight bag 202 also transmits a screenshot of the navigational chart on which the highlighting was created. The navigational chart may be transmitted, for example, as a bitmap or a vector image.

Electronic flight bag 204 receives the transmission from electronic flight bag 204. In some advantageous embodiments, when the navigational chart being displayed by touchscreen display device 208 is not the same as the navigational chart associated with the received coordinates, electronic flight bag 204 changes the currently displayed navigational chart to the navigational chart associated with the received coordinates. The navigational chart being displayed by touchscreen display device 208 is not the same as the navigational chart associated with the received coordinates, for example, when electronic flight bag 204 is presenting a different navigational chart or a menu. In a more specific example, electronic flight bag 202 sends highlighting made on a navigational chart of Newark Liberty International Airport. Electronic flight bag 204 is presently displaying a sectional map of New Jersey. Because electronic flight bag 204 is not displaying the same navigational chart as the navigational chart associated with the highlighting being sent by electronic flight bag 202, electronic flight bag 204 automatically switches to presenting a navigational chart of Newark Liberty International Airport.

Electronic flight bag 204 then presents the highlighting at the received coordinates on the associated navigational chart using touchscreen display device 208. In other embodiments, electronic flight bag 204 instead displays an alert or stores the received coordinates and the association for later retrieval. The highlighting received from electronic flight bag 204 may be displayed in the same or a different color than highlighting generated from user input on electronic flight bag 204 using touchscreen display device 208.

The illustration of vehicle 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, vehicle 200 may contain more or less than two electronic flight bags, such as electronic flight bag 202 and electronic flight bag 204. Vehicle 200 may also contain more than one navigational computer 210. Electronic flight bag 202 and electronic flight bag 204 may contain additional touchscreen display devices and/or display devices. Touchscreen display device 206 and touchscreen display device 208 may also be operated by other input means, such as a mouse or keyboard.

Figure 3:
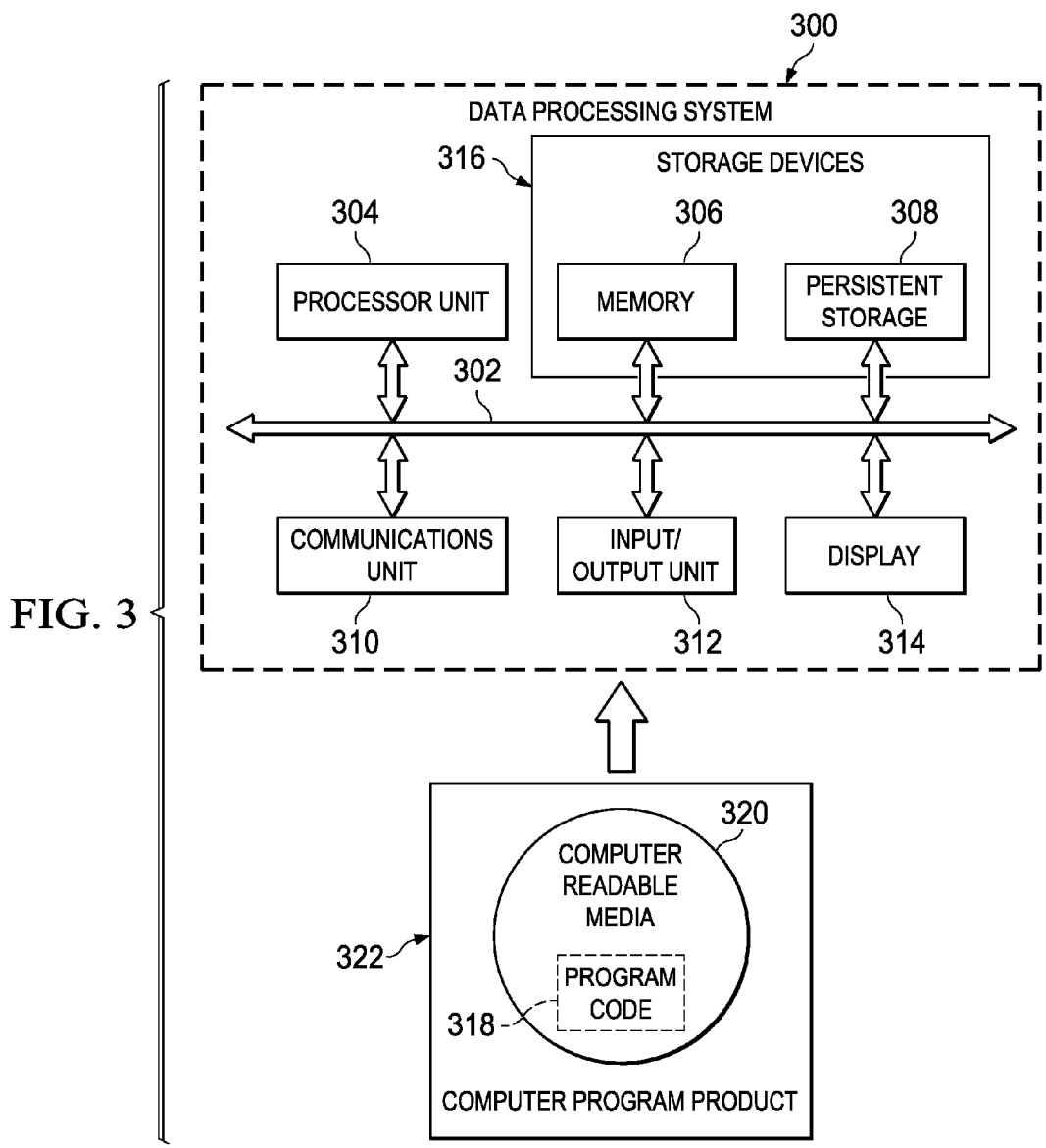
FIG. 3 is a block diagram of a data processing system in accordance with an advantageous embodiment.

Turning now to FIG. 3, a block diagram of a data processing system is depicted in accordance with an advantageous embodiment. Data processing system 300 is an example of a data processing system that may be used to implement servers and clients, such as server 104 and client 110. Further, data processing system 300 is an example of a data processing system that may be found in aircraft 116 in FIG. 1. More specifically, data processing system 300 may be an implementation of electronic flight bag 202, electronic flight bag 204, electronic flight bag 216, and/or flight control computer 246.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 320 is also referred to as computer recordable storage media. In some instances, computer readable media 320 may not be removable.

Alternatively, program code 318 may be transferred to data processing system 300 from computer readable media 320 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some advantageous embodiments, program code 318 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different advantageous embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308 and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

The advantageous embodiments recognize that making notations on a separate sheet of paper is disadvantageous for the pilot because making the notations is more time-consuming than writing directly on the navigational chart. Additionally, the notations cannot be referenced as quickly at critical moments during flight. The separate sheet of paper may also be misplaced.

The advantageous embodiments also recognize that conducting the pre-flight meeting between the pilot and the co-pilot completely orally is disadvantageous because the meeting is frequently interrupted by aircraft staff or radio transmissions. Therefore, the pilot and co-pilot may not properly remember which items were discussed and which items were not discussed. Important items may be overlooked. In view of these considerations and/or possibly other considerations, the different advantageous embodiments recognize that it would be advantageous to have a method, apparatus, and computer program product that takes into account one of more of the issues discussed above as well as possibly other issues.

Figure 4:
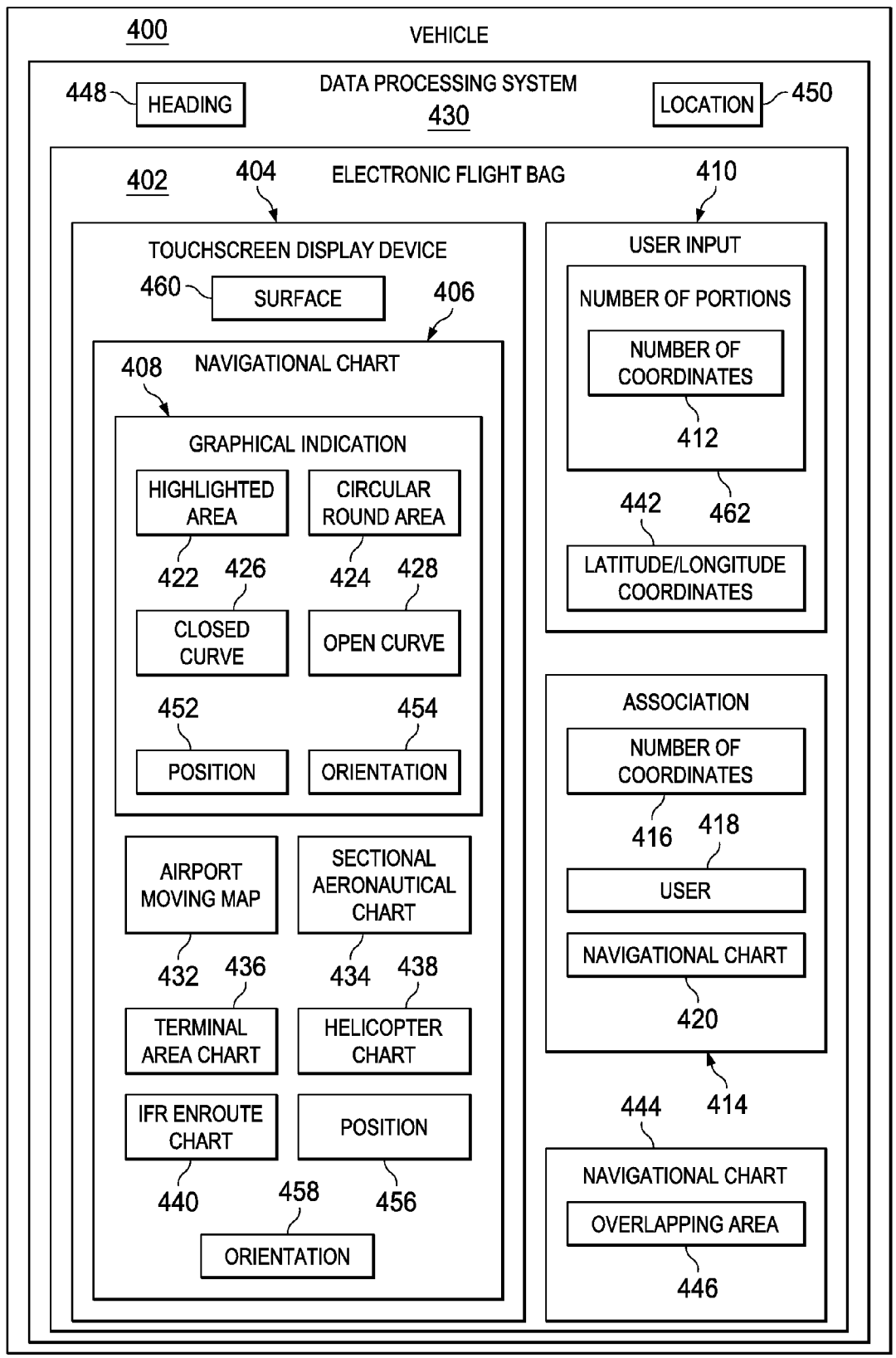
FIG. 4 is a block diagram of a data processing system within a vehicle in accordance with an advantageous embodiment.

Turning now to FIG. 4, a block diagram of a data processing system in a vehicle is depicted in accordance with an advantageous embodiment. Vehicle 400 may be vehicle 200. Data processing system 430 may be an implementation of data processing system 300. Data processing system 430 can be used, for example, to display navigational charts, to display highlighting, to highlight information on navigational charts, and to send and receive highlight information with other data processing systems 430.

In advantageous embodiments, data processing system 430 is electronic flight bag 402. Electronic flight bag 202 may also be implemented by electronic flight bag 402. Electronic flight bag 402 is in communication with touchscreen display device 404. Touchscreen display device 404 may also be connected to electronic flight bag 402. Touchscreen display 404 accepts user input through surface 460. In an advantageous embodiment, the user touches surface 460 to interact with a graphical user interface being presented on touchscreen display device 404 by electronic flight bag 402. Touchscreen display device 404 may be an implementation of touchscreen display device 206.

In one advantageous embodiment, touchscreen display device 404 presents navigational chart 406. Navigational chart 406 may contain a coordinate system encoded in navigational chart 406. In some embodiments, the coordinate system is the latitude/longitude coordinates for each point on navigational chart 406. In other embodiments, electronic flight bag 402 generates a coordinate system for the particular navigational chart 406. Navigational chart 406 may be one or more of airport moving map 432, sectional aeronautical chart 434, terminal area chart 436, helicopter chart 438, and instrument flight rules (IFR) enroute chart 440. In embodiments in which navigational chart 406 is airport moving map 432, electronic flight bag 402 updates position 456 of navigational chart 406, orientation 458 of navigational chart 406, position 452 of graphical indication 408, and orientation 454 of graphical indication 408 in response to a change in location 450 and heading 448 of vehicle 400. In other embodiments, electronic flight bag 402 may present navigational chart 406 at a scale and/or a position 456 and/or an orientation 458 that is preferable to the user.

In an advantageous embodiment, graphical indication 408 is presented by electronic flight bag 402 as an overlay over navigational chart 406. Graphical indication 408 may be any combination of highlighted area 422, closed curve 426, open curve 428, and a regular or irregular circular round area 424. Graphical indication 408 is presented on navigational chart 406 to call attention to a marked area. It should be noted that graphical indication 408 may not directly mark or even encompass the area to which attention is intended; the user may create graphical indication 408 in a shape and at a location that is preferable to the user.

In some embodiments, navigational chart 406 is presented on touchscreen display device 404 with no graphical indication 408. Electronic flight bag 402 accepts user input 410 through touchscreen display device 404. User input 410 consists of, at least in part, a number of portions 462. Number of portions 462 may be portions of surface 460 touched by the user in user input 410. Number of portions may consist of a point on surface 460, a section or path along surface 460, or all of surface 460. In an advantageous embodiment, number of portions 462 consists of number of coordinates 412. Electronic flight bag 402 determines a number of coordinates 412 by combining the location of touches of user input 410 on touchscreen display device 404 with the coordinates on navigational chart 406 that are presently at the point touched by the user. In embodiments in which navigational chart 406 has encoded latitude/longitude data, number of coordinates 412 may be latitude/longitude coordinates 442 designated by the point or points presently beneath the touches of user input 410 on navigational chart 406.

Electronic flight bag continues to gather number of portions 462 until user input 410 is concluded. In some examples, user input 410 is concluded immediately when the user ceases touching surface 460. In other examples, user input 410 is concluded when the user has ceased touching surface 460 for a predefined period of time. In yet other examples, user input 410 is concluded only when the user touches a button indicating the conclusion of user input.

Electronic flight bag 402 uses number of coordinates 412 to generate graphical indication 408 by identifying, or highlighting in some embodiments, the number of navigational chart 406 coordinates designated by number of coordinates 412.

After receiving user input 410, electronic flight bag 402 also creates and stores association 414. Association 414 associates number of coordinates 416 with user 418 and navigational chart 420. In one advantageous embodiment, number of coordinates 416 is duplicated from number of coordinates 412, user 418 is recorded as the identifier of the user presently logged on to electronic flight bag 402, and navigational chart 420 is navigational chart 406 being presented at the time of user input 410.

Electronic flight bag 402 stores association 414 in the event a different navigational chart is requested by user 418, such as navigational chart 444. If user 418 requests that electronic flight bag 402 present navigational chart 406 again, electronic flight bag 402 retrieves association 414, generates graphical indication 408 and presents navigational chart 406 with graphical indication 408. Electronic flight bag 402 may display graphical indication 408 as an overlay of navigational chart 406.

In other embodiments, association 414 is stored on or transferred to a portable memory device that can be retrieved on a different electronic flight bag 402. After connecting a portable memory device to a second electronic flight bag 402, the second electronic flight bag 402 receives user load request 464. User load request 464 may be an input from the user in the form of one or more touches to touchscreen display device 404. User load request 464 is issued for a particular navigational chart 406. In an example, user load request 464 takes the form of the user touching a load button corresponding to a map of Dallas/Fort Worth International Airport. Upon receiving user load request 464, the second electronic flight bag 402 loads association 414 from the portable memory device. The second electronic flight bag 402 then presents graphical indication 408 on touchscreen display device 404.

For example, a user inputs number of portions 462 on a map of Dallas/Fort Worth International Airport by touching touchscreen display device 404 connected to a first electronic flight bag 402. The first electronic flight bag 402 stores association 414 on a portable memory device. The user disconnects portable memory device from the first electronic flight bag 402, and then connects the portable memory device to a second electronic flight bag 402.

Continuing with the example, the user then touches a load button corresponding to map of Dallas/Fort Worth International Airport on the touchscreen display device 404 at the second electronic flight bag 402. The second electronic flight bag locates association 414 that contains user 418 that matches the current user and navigational chart 420 that matches the map requested in user load request 464, that is, the map of Dallas/Fort Worth International Airport. The second electronic flight bag 404 then uses number of coordinates 416 stored in association 414 on the portable memory device to generate and present graphical indication 408 over the map of Dallas/Fort Worth International Airport.

In one advantageous embodiment in which navigational chart 406 is encoded with latitude/longitude coordinates, electronic flight bag 402 changes from presenting navigational chart 406 to presenting navigational chart 444 in response to a user request. Navigational chart 444 overlaps navigational chart 406 at overlapping area 446.

Navigational chart 444 overlaps navigational chart 406 when the geographic areas depicted by navigational chart 444 and navigational chart 406 have an intersection that is not null. For example, a navigational chart depicting Dallas/Fort Worth International Airport overlaps with a navigational chart depicting Texas.

After presenting navigational chart 444, electronic flight bag 402 locates associations 414 for the user 418 that contain number of coordinates 416 that are contained within the latitude/longitude boundaries of navigation chart 406. Electronic flight bag 402 then generates graphical indications 408 at the number of coordinates found in matching associations 414. Electronic flight bag 402 may scale graphical indication 408 in the event the scale of navigational chart 406 does not match the scale of navigational chart 444.

The illustration of data processing system 430 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, electronic flight bag 402 may be connected to more than one touchscreen display devices 404. Each touchscreen display device 404 may display more than one navigational chart 406. Additionally, electronic flight bag 402 may generate multiple graphical indications 408 and present any or all the graphical indications 408 using touchscreen display device 404. Electronic flight bag 402 may also contain more than one association 414. Association 414 may be stored in a memory, such as memory 306, and/or storage 108.

Figure 5:
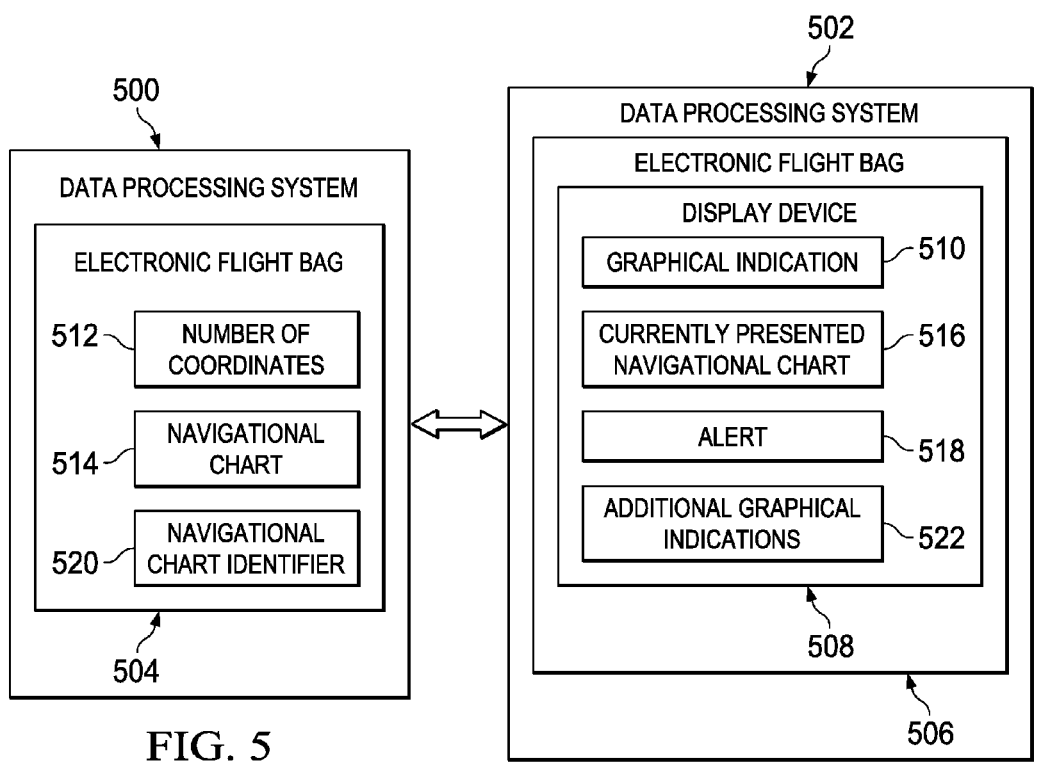
FIG. 5 is a block diagram illustrating transmission of navigational information between two data processing systems in accordance with advantageous embodiments.

Turning now to FIG. 5, a diagram illustrating transmission of navigational information between two data processing systems is depicted in accordance with an advantageous embodiment. Data processing system 500 and data processing system 502 may be implementations of data processing system 300. Electronic flight bag 504 and electronic flight bag 506 may be implementations of electronic flight bag 402. Display device 508 may implement display device 212 or touchscreen display device 404.

In one advantageous embodiment, electronic flight bag 504 has received a user input to transmit number of coordinates 512 and navigational chart 514 to electronic flight bag 506. Number of coordinates 512 may implement number of coordinates 412. Number of coordinates 512 may be coordinates specific to navigational chart 514 or latitude/longitude coordinates. Navigational chart 514 may be a unique identifier for the map associated with number of coordinates 512. Alternatively, navigational chart 514 may be a bitmap or vector image.

Electronic flight bag 504 transmits number of coordinates 512 and navigational chart 514 to electronic flight bag 506, and electronic flight bag 506 receives number of coordinates 512 and navigational chart 514. Electronic flight bag 506 compares currently presented navigational chart 516 to navigational chart 514 received from electronic flight bag 504.

In some embodiments, if currently presented navigational chart 516 is not the same as navigational chart 514, electronic flight bag 506 presents the user with alert 518. Alert 518 may be a message indicating the receipt of data from electronic flight bag 504. Alert 518 may also present the user with a button or other control to allow the user to request that electronic flight bag 506 switch to presenting navigational chart 514. In other advantageous embodiments, navigational chart 514 may be presented simultaneously with currently presented navigational chart 516 using graphical user interface techniques, such as windows or side-by-side viewing. In yet other advantageous embodiments, electronic flight bag 506 automatically changes the content of display device 508 to present navigational chart 514.

Electronic flight bag 506 then generates graphical indication 510 and overlays graphical indication 510 on navigational chart 514 at number of coordinates 512. In one advantageous embodiment, number of coordinates 512 are in the coordinate system of navigational chart 514. One example of such a coordinate system is latitude/longitude coordinates. In the embodiment, electronic flight bag 506 is presenting navigational chart 514 at a different scale and/or orientation than the scale and orientation that was presented by electronic flight bag 504 at the time number of coordinates 512 was determined based on a user input, such as user input 410.

In this advantageous embodiment, electronic flight bag 506 generates and overlays graphical indication 510 with respect to the current rotation and scale being presented by electronic flight bag 506. In other words, because number of coordinates 512 are in the coordinate system of navigational chart 514, electronic flight bag 506 generates graphical indication 510 and overlays graphical indication 510 on navigational chart 514 such that graphical indication 510 rotates and/or scales to the current orientation and scale being presented by electronic flight bag 506.

By way of example, a first user, using electronic flight bag 504, views a navigational chart of Texas at 1:1 scale with an orientation such that the current orientation of the aircraft is represented as upward on the navigational chart. The first user inputs a series of touches at electronic flight bag 504, which electronic flight bag 504 converts to number of coordinates 512 and presents as a graphical indication. Responsive to the first user issuing a command to transmit number of coordinates 512, electronic flight bag 504 transmits number of coordinates 512 to electronic flight bag 506. As described previously, electronic flight bag 504 may transmit other data with number of coordinates 512, such as navigational chart identifier 520.

Continuing with the example, electronic flight bag 506 is being used by a second user. Electronic flight bag 506 receives number of coordinates 512. The second user is using electronic flight bag 506 to view the same navigational chart of Texas as the first user at electronic flight bag 504. However, the second user prefers to view the navigational chart of Texas at 2:1 scale and an orientation such that true north is upward on the navigational chart. Thus, electronic flight bag 506 presents the navigational chart of Texas at 2:1 scale and an orientation such that true north is upward on the navigational chart.

Electronic flight bag 506 generates a graphical indication using the number of coordinates received from electronic flight bag 504. Electronic flight bag 506 presents the graphical indication at the number of coordinates. Because the number of coordinates are in the coordinate system of the map, the graphical indication presented by electronic flight bag 504 will increase in scale (to 2:1) and rotate to match the true north orientation. As a result, portions of the navigational chart identified by the first user are accurately portrayed to the second user, regardless of the scale and orientation differences between the two presentations of the navigational chart.

In advantageous embodiments, graphical indication 510 may be presented in an alternative color or style to distinguish the input of the user at electronic flight bag 504 from the input of the user at electronic flight bag 506 on display device 508. Electronic flight bag 506 may also store number of coordinates 512 and navigational chart 514 as an association, such as association 414.

In other embodiments, when data is received from electronic flight bag 504, electronic flight bag 506 stores an association, such as association 414, and presents no alert on display device 508. In the event electronic flight bag 506 presents navigational chart 514 in response to a user request at electronic flight bag 506, electronic flight bag 506 loads the association and generates graphical indication 510.

In yet other embodiments, the transmission of number of coordinates 512 and navigational chart 514 is initiated by a request from electronic flight bag 506. In response to the request for a particular navigational chart 514, electronic flight bag 504 returns number of coordinates 512 and navigational chart 514. In this way, electronic flight bag 506 pulls number of coordinates 512 from electronic flight bag 504, rather than electronic bag 504 pushing data to electronic flight bag 506.

The user at electronic flight bag 506 may then make additions to the received graphical indication 510 and send the result back to electronic flight bag 504 or another data processing system 500. Once electronic flight bag 506 has presented graphical indication 510 and navigational chart 514, electronic flight bag 506 may receive user input, such as user input 410, using display device 508. In some advantageous embodiments, display device 508 is a touchscreen display device, such as touchscreen display device 404. Like user input 410, the user input may consist of a number of portions or a number of coordinates, such as number of portions 462 and number of coordinates 412, respectively.

Electronic flight bag 506 uses the number of portions or number of coordinates to generate additional graphical indicators 522. Additional graphical indications 522 are graphical indications like graphical indication 408. In one advantageous embodiment, additional graphical indications 522 are displayed simultaneously with graphical indication 510 on display device 508.

In some examples, electronic flight bag 506 may already be displaying graphical indication 510 generated from user input at electronic flight bag 506. In such a case, the received graphical indication 510 may be added to the existing graphical indication 510 on display device 508.

Additional graphical indications 522 may be displayed such that additional graphical indications 522 are visually distinguishable from graphical indication 510 generated by the user input at electronic flight bag 506. For example, the additional graphical indications 522 may be displayed in a different color than graphical indication 510 received from electronic flight bag 504.

In an advantageous embodiment, electronic flight bag 506 transmits the number of coordinates 512 that were used to generate additional graphical indications 522 to electronic flight bag 504 upon user request. Electronic flight bag 506 may also transmit navigational chart 514 as, for example, an identifier or a screenshot. Electronic flight bag 506 may additionally transmit an identification of the user who input additional graphical indications 522.

Upon receipt, electronic flight bag 504 uses number of coordinates 512 and navigational chart 514 to create an association, such as association 414. Electronic flight bag 504 then generates graphical indication 510 from the number of coordinates 512 received from electronic flight bag 506, and displays graphical indication 510 as an overlay on navigational chart 514.

The illustration of data processing system 500 and data processing system 502 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, electronic flight bag 504 may transmit number of coordinates 512 to more than one electronic flight bag 506. Electronic flight bag 504 may also transmit additional data, such as a timestamp for the input that generated number of coordinates 512, or a user that provided the input. Additionally, electronic flight bag 506 may be connected to more than one display device 508. Electronic flight bag 506 may present the user with a dialog requesting an input for which display device 508 should be used to present navigational chart 514 and graphical indication 510.

Figure 6:
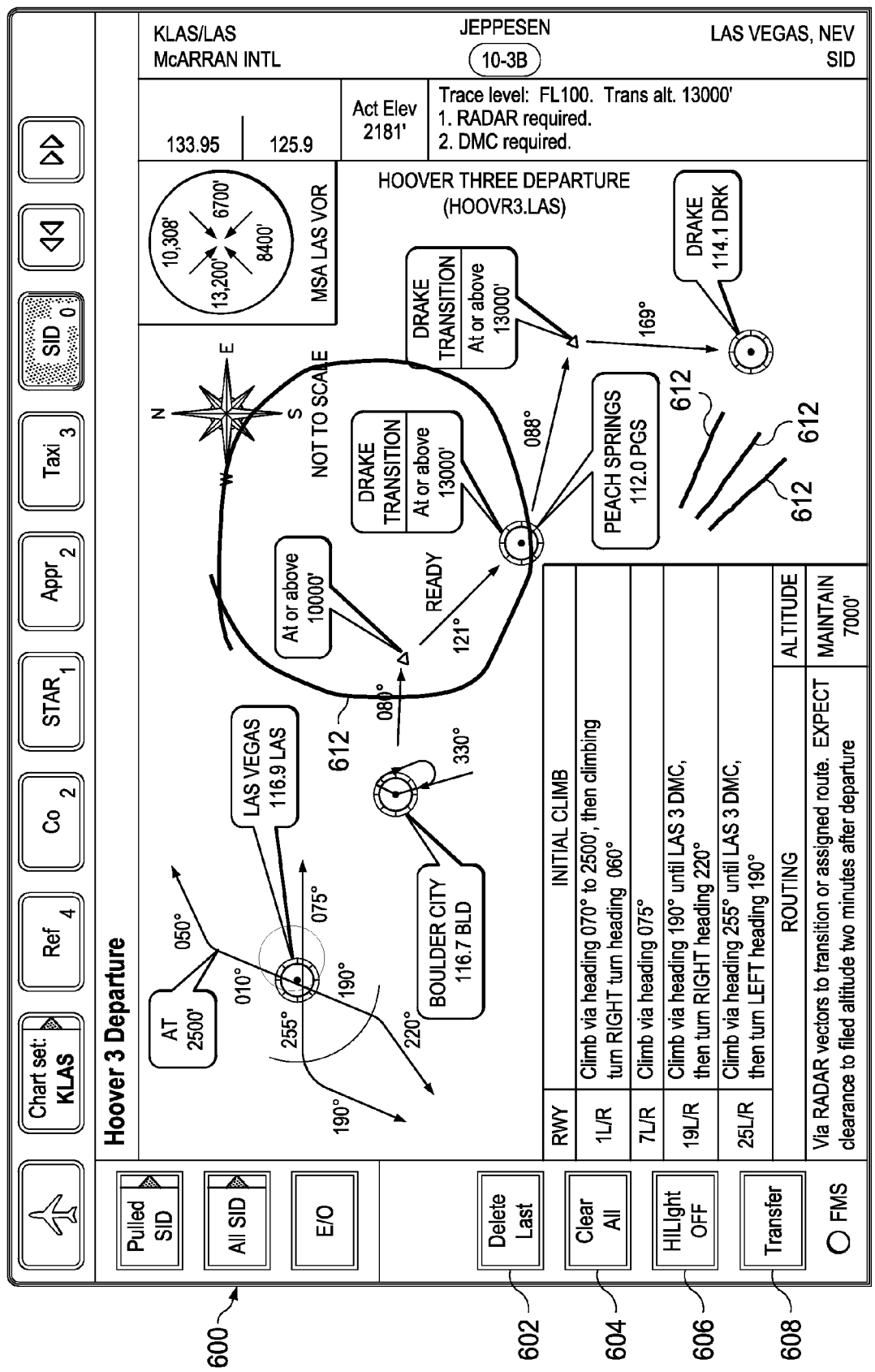
FIG. 6 is an illustration of a graphical user interface presenting controls and a navigational chart in accordance with an advantageous embodiment.

Turning now to FIG. 6, an illustration of a graphical user interface presenting controls and a navigational chart is depicted in accordance with an advantageous embodiment. Graphical user interface 600 may be generated by electronic flight bag 402 and displayed by touchscreen display device 404.

In this example, the user is viewing navigational chart 610. Highlight mode is already enabled, as indicated by the enabled nature of highlight button 606. To create a highlight, such as graphical indication 408, the user touches the area desired to be highlighted. In this example, the user has touched the area at highlight 612. In the event the user made an error, the user may touch delete last button 602. Delete last button 602 deletes the association, such as association 414, that encompasses the most recently created number of coordinates identified by the electronic flight bag. The highlight 612 for the removed association is also removed from graphical user interface 600.

The user may instead touch clear all button 604 to delete all associations for this user on this navigational chart 610. Electronic flight bag would then remove all highlights 612 represented by the associations from graphical user interface 600.

The user may touch transfer button 608 in order to transfer all highlights 612 for the present user on navigational chart 610 to another electronic flight bag. In one advantageous embodiment, the user is presented with a menu and/or field to select the intended recipients of the transmission. In another embodiment, the electronic flight bag is preconfigured to transmit to a specific electronic flight bag. For example, a co-pilot electronic flight bag may be preconfigured to transmit highlights to the pilot onboard the aircraft.

Figure 7:
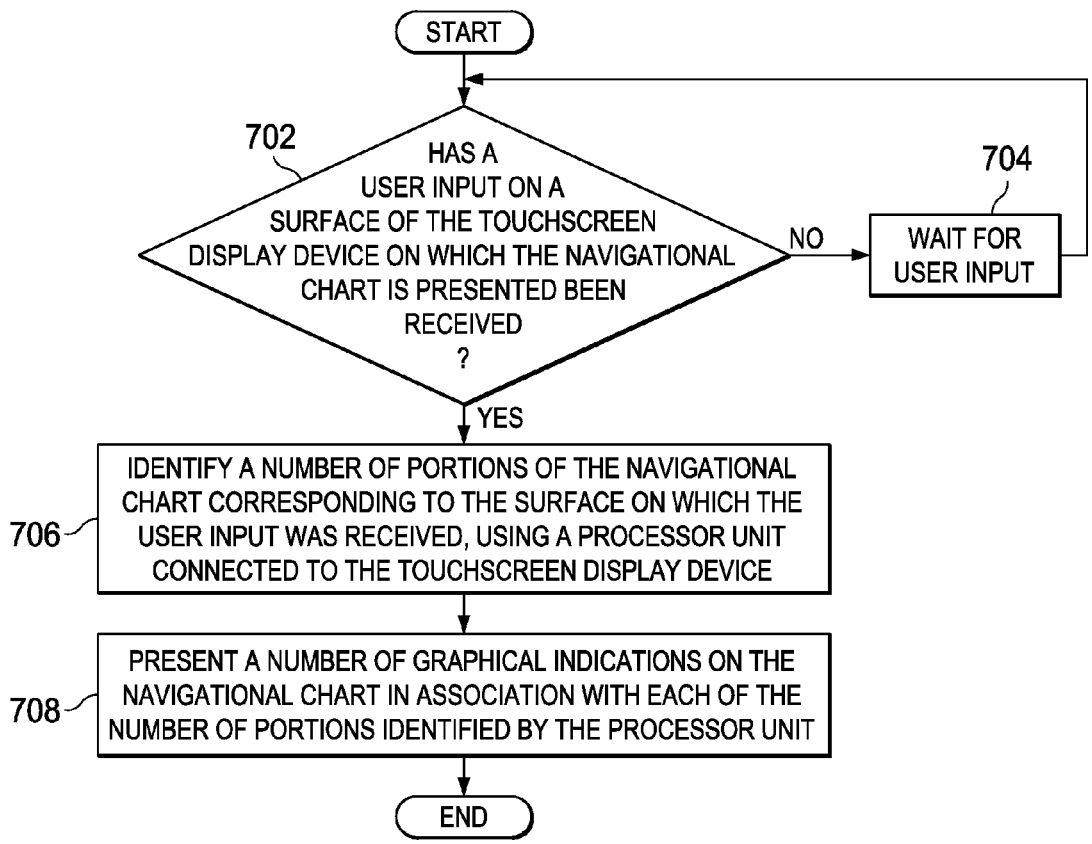
FIG. 7 is a flowchart of a process for managing presentation of a navigational chart on a touchscreen display device in accordance with an advantageous embodiment.

Turning now to FIG. 7, a flowchart of a process for managing presentation of a navigational chart on a touchscreen display device in accordance with an advantageous embodiment is depicted. In advantageous embodiments, the process is implemented in data processing system 430. The process may be performed by electronic flight bag 402.

The process begins by determining whether a user input on a surface of the touchscreen display device on which the navigational chart is presented has been received (operation 702). If a user input on a surface of the touchscreen display device on which the navigational chart is presented has not been received, the process waits for user input (operation 704). If a user input on a surface of the touchscreen display device on which the navigational chart is presented was received at operation 702, the process identifies a number of portions of the navigational chart corresponding to the surface on which the user input was received (operation 706). Operation 706 may be performed using a processor unit connected to the touchscreen display device. The process then presents a number of graphical indications on the navigational chart in association with each of the number of portions identified by the processor unit (operation 708). The process terminates thereafter.

FIG. 8 depicts a flowchart of a process for transmission of navigational information between two electronic flight bags in accordance with an advantageous embodiment. In advantageous embodiments, the process is implemented in data processing system 430. The process may be performed by electronic flight bag 504 upon a user input requesting the electronic flight bag to send highlighting to another electronic flight bag 506.

The process begins by identifying a number of portions of the navigational chart corresponding to the surface on which a user input was received, using a processor unit connected to the touchscreen display device (operation 802). The number of portions is a number of portions of the surface of a touchscreen display device, such as number of portions 462. The number of portions may be a number of coordinates. In some embodiments, the number of coordinates are coordinates on the map, such as latitude/longitude coordinates. In other embodiments, the number of coordinates is coordinates with respect to the surface of the touchscreen display device. The process then presents a number of graphical indications on the navigational chart in association with each of the number of portions identified by the processor unit (operation 804). The number of graphical indications may be presented by displaying the number of graphical indications on the navigational chart using the touchscreen display device. In some embodiments, the number of portions are also stored in association with the navigational chart. The navigational chart may be stored using an identifier or as a copy of the entire navigational chart.

The process then sends the number of portions to a second processor unit (operation 806). In some examples, the process may also send a navigational chart identifier to the second processor unit. The second processor unit may be in an electronic flight bag, such as electronic flight bag 402. The process then presents the number of graphical indications on the navigational chart on a display device connected to the second processor unit using the number of portions (operation 808).

The process then determines whether a user input on a surface of the touchscreen display device connected to the second processing unit has been received (operation 810). If a user input on a surface of the touchscreen display device connected to the second processing unit has not been received, the process waits for user input (operation 812). If a user input on a surface of the touchscreen display device connected to the second processing unit was received at operation 810, the process identifies a second number of portions of the navigational chart corresponding to the second surface on which the second user input was received, using the second processor unit (operation 814). As an example of operation 814, the user who received the transmitted number of portions now generates input at the surface of the touchscreen display device additional number of portions. In the example, the process at operation 814 identifies the portions touched by the user on his electronic flight bag's touchscreen display device.

The process then presents a number of additional graphical indications on the navigational chart in association with each of the second number of portions identified by the second processor unit (operation 816). The number of additional graphical indications are visually differentiable from the number of graphical indications on the second touchscreen display device. In some examples, the process displays, on the touchscreen display device connected to the second electronic flight bag, the highlight data received from the first electronic flight bag simultaneously with the highlight data generated by the user at the second electronic flight bag. The highlight data is displayed such that each user's data can be visually discerned from another user's data. In one example, each user's highlight data appears in a different color from every other user's highlight data.

The process continues when, in response to a user request, the process sends the second number of portions and the navigational chart identifier to the first processing unit (operation 818). In some examples, the user designates the recipient of the number of portions and the navigational chart identifier. In other examples, the recipient is automatically designated as the original sending electronic flight bag.

The process then presents the additional graphical indications on the navigational chart using the first touchscreen display device. In some examples, the original graphic indications are also displayed on the first touchscreen display device. In such examples, the user can see both his original sent highlight data, as well as the data added by the second user at the second electronic flight bag. The process terminates thereafter.

Figure 9:
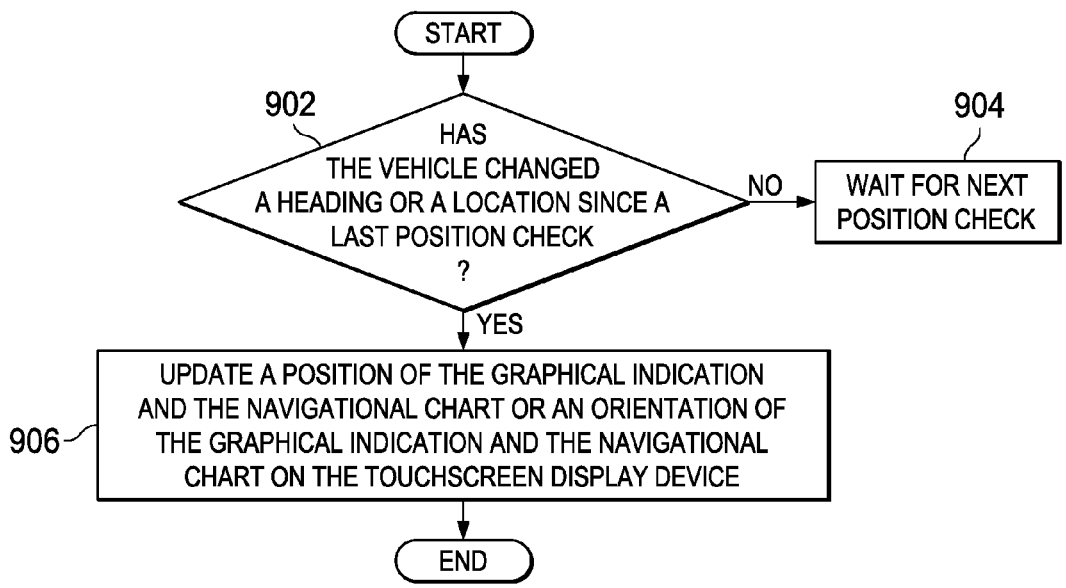
FIG. 9 is a flowchart of a process for updating a position and/or an orientation of a graphical indication and a navigational chart in accordance with an advantageous embodiment.

Turning now to FIG. 9, a flowchart of a process for updating a position and/or an orientation of a graphical indication and a navigational chart is depicted in accordance with an advantageous embodiment. In advantageous embodiments, the process is implemented in data processing system 430. The process may be performed by electronic flight bag 402 in vehicle 400.

The process begins by determining whether the vehicle has changed a heading or a location since a last position check. If the vehicle has not changed a heading or a location since the last position check, the process waits for the next position check (operation 904). If the vehicle has changed heading and/or location since the last position check at step operation 902, the process updates a position of the graphical indication and the navigational chart or an orientation of the graphical indication and the navigational chart on the touchscreen display device (operation 906). The process terminates thereafter.

Figure 10:
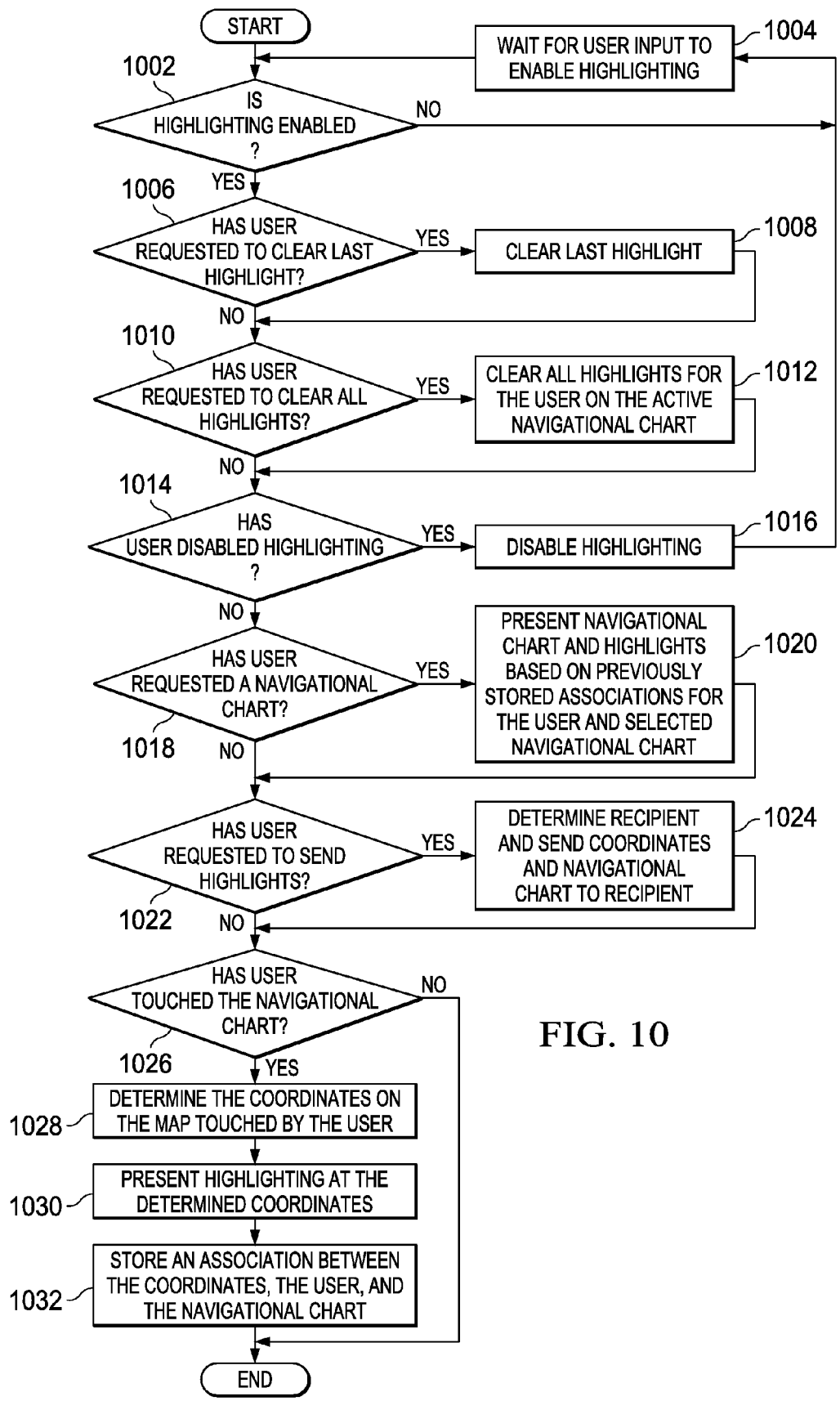
FIG. 10 is an additional flowchart of a process for managing presentation of a navigational chart on a touchscreen display device in accordance with an advantageous embodiment.

Turning now to FIG. 10, an additional flowchart of a process for managing presentation of a navigational chart on a touchscreen display device is depicted in accordance with an advantageous embodiment. In advantageous embodiments, the process is implemented in data processing system 430. The process may be performed by electronic flight bag 402.

The process begins by determining whether highlighting is enabled (operation 1002). If highlighting is not enabled, the process waits for user input to enable highlighting and returns to operation 1002 (operation 1004). If highlighting is enabled, the process determines whether the user has requested to clear the last highlight (operation 1006). If the user has requested to clear the last highlight, the process clears the most recently generated highlight and proceeds to operation 1010 (operation 1008).

If the user did not request to clear the last highlight at operation 1006, the process determines whether the user has requested to clear all highlights (operation 1010). If the user has requested to clear all highlights, the process clears all highlights for the user on the active navigational chart and the process proceeds to operation 1014 (operation 1012). If the user did not request to clear all highlights at operation 1010, the process determines whether the user has requested to disable highlighting (operation 1014). If the user requested to disable highlighting, then the process disables highlighting functionality and returns to operation 1004 (operation 1016).

If the user did not request to disable highlighting at operation 1016, the process determines whether the user has requested a navigational chart (operation 1018). If the user has requested a navigational chart, the process presents the requested navigational chart and highlights based on previously stores associations for the user and selected navigational chart, and proceeds to operation 1022 (operation 1020). If the user did not request a navigation chart at operation 1018, the process determines whether the user has requested to send highlights (operation 1022). If the user did request to send highlights, the process determines the recipient of the highlights and sends the coordinates and navigational chart to the recipient, and proceeds to operation 1026 (operation 1024). If the user did not request to send highlights at operation 1022, the process determines whether the user has touched the navigational chart (operation 1026). If the user has not touched the navigational chart, the process terminates. If the user has touched the navigational chart at operation 1026, the process determines the coordinates on the map touched by the user (operation 1028). The process then presents highlighting at the determined coordinates (operation 1030). The process then stores an association between the coordinates, the user, and the navigational chart (operation 1032). The process terminates thereafter.

Figure 11:
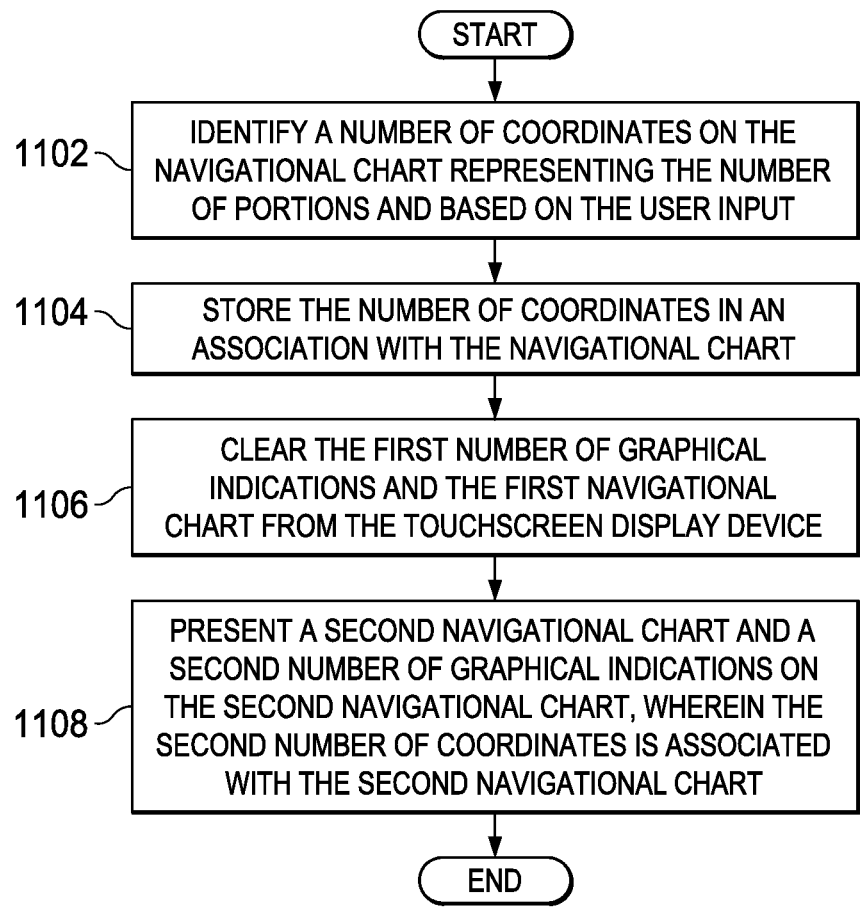
FIG. 11 is a flowchart of a process for storing and loading navigational information in accordance with an advantageous embodiment.

Turning now to FIG. 11, a flowchart of a process for storing and loading navigational information in accordance with an advantageous embodiment is depicted. In advantageous embodiments, the process is implemented in data processing system 430. The process may be performed by electronic flight bag 402, and may be performed when the user enters some highlighting data and then requests to view a different navigational chart.

The process begins by identifying a number of coordinates on the navigational chart representing the number of portions and based on the user input (operation 1102). Operation 1102 is performed to discern the coordinates on the navigational chart designated by the user input. The process then stores the number of coordinates in an association with the navigational chart (operation 1104).

The process then clears the first number of graphical indicators and the first navigational chart from the touchscreen display device (1106). In an advantageous embodiment, operation 1106 is performed when the user requests to view a different navigational chart, such as navigational chart 444. The process then presents a second navigational chart and a second number of graphical indications on the second navigational chart, wherein the second number of coordinates is associated with the second navigational chart (Operation 1108). Operation 1108 may be performed by retrieving one or more associations from memory, such as association 414. The one or more associations each contain a number of coordinates, a user, and a navigational chart.

At operation 1108, the process only presents graphical indications based on coordinates that are part of associations that match the current user and the requested navigational chart. For example, the user requests to view a navigational chart of Dallas/Fort Worth International Airport. At operation 1108, the process only presents graphical indications based on associations that contain both the current user and the identifier of the navigational chart for Dallas/Fort Worth International Airport. In the example, an association that contained highlight data for another pilot for the same navigational chart would not be loaded or displayed. Likewise, highlight data for the current user associated with a navigational chart of Wyoming would not be presented. In this way, the process only presents graphical indications, or highlight data in some examples, that are relevant to the current user and requested map. In some examples, the result is that only highlight data generated on the requested chart by the current user is presented when the chart is later requested by the current user. After operation 1108, the process terminates.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments provide a pilot, co-pilot, or other user with the ability to highlight information on an electronic navigational chart using an electronic flight bag with a touchscreen display device, and to store highlight data on a per-map and per-user basis. The user can transport the highlight data using portable memory and load and display the highlight data on another electronic flight bag. For example, a pilot may create highlight data for a variety of navigational charts using one electronic flight bag days prior to flight, and load the highlight data into an electronic flight bag mounted in the cockpit of the pilot's next flight.

The advantageous embodiments also provide the user with the ability to send highlight data to another user using another electronic flight bag, and receive highlight data from another electronic flight bag. Received highlight data is displayed such that the received highlight data is visually differentiable from the receiving user's own highlight data, which may be accomplished by using different colors for the highlight data of different users displayed on the same display device. Once the received data is displayed, the user can mark up the received data with additional highlight data and send the additional highlight data to the original sender or another user. The transmission of highlight data between electronic flight bags increases flight safety because pilots and co-pilots need not divert attention from important telemetry during flight to see a highlight another individual on the ground or on the flight deck has created.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touchscreen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing presentation of a navigational chart on a touchscreen display device, the method comprising:
    receiving an input of an unrestricted shape at any location on a surface of the touchscreen display device while the navigational chart is presented;
    identifying, using a processor unit connected to the touchscreen display device, a number of portions of the navigational chart corresponding to the surface on which the input was received, wherein identifying comprises: determining a touchscreen display device coordinate of the input, and combining the touchscreen display device coordinate of the input with coordinates on the navigational chart presented, at the location corresponding to the input received, and further wherein the number of portions comprise input that does not create a route; and
    presenting a number of graphical indications on the navigational chart in association with each of the number of portions identified by the processor unit, wherein the graphical indications comprise a translucent overlay over the navigational chart, further wherein the overlay comprises a graphical indication for every location receiving the input.

2. The method of claim 1 further comprising:
    identifying a number of coordinates on the navigational chart representing the number of portions and based on the input; and
    storing the number of coordinates in an association with other data, wherein the other data comprises: the navigational chart and a user identification.

3. The method of claim 2, wherein the number of coordinates is a first number of coordinates, wherein the number of graphical indications is a first number of graphical indications, and wherein the navigational chart is a first navigational chart, and further comprising:
    clearing the first number of graphical indications and the first navigational chart from the touchscreen display device; and
    presenting a second navigational chart and a second number of graphical indications on the second navigational chart, wherein the second number of graphical indications is associated with the second navigational chart.

4. The method of claim 2, wherein the step of storing the number of coordinates in association with the navigational chart comprises storing, in a memory, the number of coordinates in association with the navigational chart and the input, wherein the processing unit is a first processing unit, wherein the touchscreen display device is a first touchscreen display device, wherein the number of graphical indications is a first number of graphical indications, and further comprising:
    receiving a load request, at a second touchscreen display device connected to a second processing unit, for the navigational chart;
    presenting, using the second touchscreen display device, a second number of graphical indications representing the number of coordinates stored in the memory that are associated with a user and the navigational chart.

5. The method of claim 1, wherein the processor unit is a first processor unit and further comprising:
    sending the number of portions to a second processor unit; and
    presenting the number of graphical indications the navigational chart on a second display device connected to the second processor unit using the number of portions.

6. The method of claim 2, wherein the processor unit is a first processor unit and further comprising:
sending the number of coordinates and the navigational chart to a second processor unit; and
presenting the number of graphical indications on a second display device connected to the second processor unit using the number of coordinates.

7. The method of claim 5, further comprising the input being a first input, wherein the surface is a first surface, wherein the touchscreen display device is a first touchscreen display device, wherein the display device is a second touchscreen display device, wherein sending the number of portions further comprises sending a navigational chart identifier to the second processing unit, wherein the number of portions is a first number of portions, and further comprising:
receiving a second input on a second surface of the second touchscreen display device;
identifying a second number of portions of the navigational chart corresponding to the second surface on which the second input was received, using the second processor unit;
presenting a number of additional graphical indications on the navigational chart in association with each of the second number of portions identified by the second processor unit, wherein the number of additional graphical indications are visually differentiable from the number of graphical indications on the second touchscreen display device;
sending the second number of portions and the navigational chart identifier to the first processing unit; and
presenting the additional graphical indications on the navigational chart using the first touchscreen display device.

8. The method of claim 1, wherein the processor unit and the touchscreen display device is part of an electronic flight bag.

9. The method of claim 1, wherein the processor unit and the touchscreen display device are associated with a platform selected from one of a mobile platform, a stationary platform, a land-based structure, an aquatic-based structure, a space-based structure, a vehicle, an aircraft, spacecraft, a surface ship, a train, a bus, a submarine, a flight control tower, and a dispatch center.

10. The method of claim 1, wherein the navigational chart is selected from one of an airport moving map, a sectional aeronautical chart, a terminal area chart, a helicopter chart, and an aeronautical enroute chart.

11. The method of claim 1, wherein the processor unit and the touchscreen display device are associated with a vehicle, and further comprising:
determining whether the vehicle has changed a heading or a location since a last position check; and
responsive to a determination that the vehicle has changed the heading or the location since the last position check, updating a position of the graphical indication and the navigational chart or an orientation of the graphical indication and the navigational chart on the touchscreen display device.

12. The method of claim 2, further comprising the graphical indication being a first graphical indication, wherein the navigational chart is a first navigational chart, wherein the input is a first input, wherein the number of coordinates comprises a number of latitude/longitude coordinates, and further comprising:
receiving a second input, using the touchscreen display device, designating a second navigational chart that depicts an overlapping area with the first navigational chart; and
responsive to receiving the second input, presenting the second navigational chart and a second graphical indication on the second navigational chart at each of the number of latitude/longitude coordinates.

13. A computer program product comprising:
a computer usable non-transitory storage medium including computer usable program code for managing presentation of a navigational chart on a touchscreen display device, the computer program product including instructions adapted to cause a computer to perform steps comprising:
receiving an input of an unrestricted shape at any location on a surface of the touchscreen display device while the navigational chart is presented;
identifying, using a processor unit connected to the touchscreen display device, a number of portions of the navigational chart corresponding to the surface on which the input was received, wherein identifying comprises: determining a touchscreen display device coordinate of the input, and combining the touchscreen display device coordinate of the input with coordinates on the navigational chart presented, at the location corresponding to the input received, and further wherein the number of portions comprise: input that does not create a route; and
presenting a number of graphical indications on the navigational chart in association with each of the number of portions identified by the processor unit, wherein the graphical indications comprise an overlay over the navigational chart, further wherein the overlay comprises: a graphical indication for every location receiving the input.

14. The computer program product of claim 13, wherein the program code is further adapted to cause the computer to perform steps comprising:
identifying a number of coordinates on the navigational chart representing the number of portions and based on the input; and
storing the number of coordinates in an association with other data, wherein the other data comprises: the navigational chart, and a user identification.

15. The computer program product of claim 14, wherein the number of coordinates is a first number of coordinates, wherein the number of graphical indications is a first number of graphical indications, and wherein the navigational chart is a first navigational chart, and the program code is further adapted to cause the computer to perform steps comprising:
clearing the first number of graphical indications and the first navigational chart from the touchscreen display device; and
presenting a second navigational chart and a second number of graphical indications on the second navigational chart, wherein the second number of graphical indications is associated with the second navigational chart.

16. The computer program product of claim 14, wherein the step of storing the number of coordinates in association with the navigational chart comprises storing, in a memory, the number of coordinates in association with the navigational chart and the input, wherein the processing unit is a first processing unit, wherein the touchscreen display device is a first touchscreen display device, wherein the number of graphical indications is a first number of graphical indications, and further comprising:
receiving a load request, at a second touchscreen display device connected to a second processing unit, for the navigational chart;
presenting, using the second touchscreen display device, a second number of graphical indications representing the number of coordinates stored in the memory that are associated with a user and the navigational chart.

17. An apparatus comprising:

a touchscreen display device; and a processor unit in communication with the touchscreen display device, wherein the processor unit is configured to:

receive an input of an unrestricted shape at any location on a surface of the touchscreen display device on which a navigational chart is presented;

identify, using a processor unit connected to the touchscreen display device, a number of portions of the navigational chart corresponding to the surface on which the input was received, wherein identifying comprises: determining a touchscreen display device coordinate of the input, and combining the touchscreen display device coordinate of the input with coordinates on the navigational chart presented, at the location corresponding to the input received, and further wherein the number of portions comprise: input that does not create a route; and present a number of graphical indications on the navigational chart in association with each of the number of portions identified by the processor unit, wherein the graphical indications comprise an overlay over the navigational chart, further wherein the overlay comprises: a graphical indication for every location receiving the input.

18. The apparatus of claim 17, wherein the processing unit is further directed to identify a number of coordinates on the navigational chart representing the number of portions and based on the input, and store the number of coordinates in association with other data, wherein the other data comprises: the navigational chart and a user identification.

19. The apparatus of claim 18, wherein the processor unit is a first processor unit and further comprising:

a second display device; and a second processor unit in communication with the second display device and the first processor unit, wherein the second processor unit is configured to receive the number of coordinates from the first processor unit and present the graphical indication on the navigational chart on the second display device using the number of coordinates.

20. The method of claim 2, further comprising:

receiving a request to present a stored navigational chart with graphical indications on the navigational chart in association with each of the number of portions identified by the processor unit and associated with the user identification; and presenting, the stored navigational chart with graphical indications on the navigational chart in association with each of the number of portions identified by the processor unit and associated with the user identification.

\* \* \* \* \*